Aug. 4, 1942.   G. O. HILLIER   2,291,963
METHOD AND APPARATUS FOR FILTRATION
Filed May 11, 1938   2 Sheets-Sheet 1
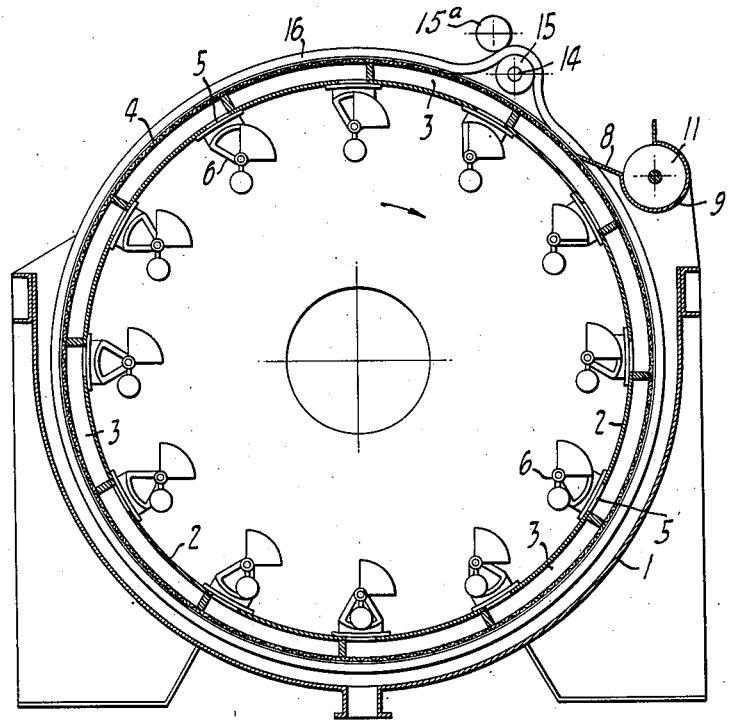
FIG_1_
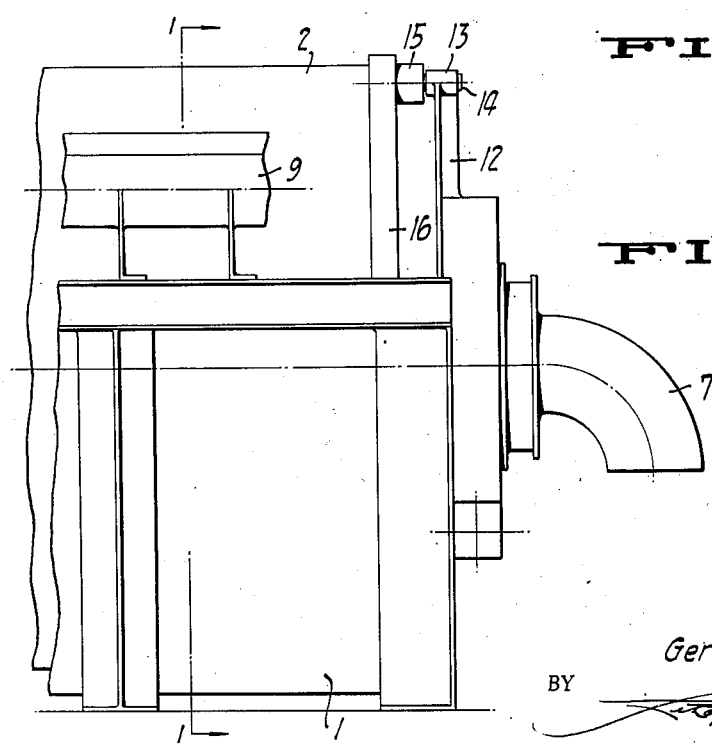
FIG_2_
INVENTOR.
Gerald O. Hillier
BY
ATTORNEY.

Aug. 4, 1942.    G. O. HILLIER    2,291,963
METHOD AND APPARATUS FOR FILTRATION
Filed May 11, 1938    2 Sheets—Sheet 2
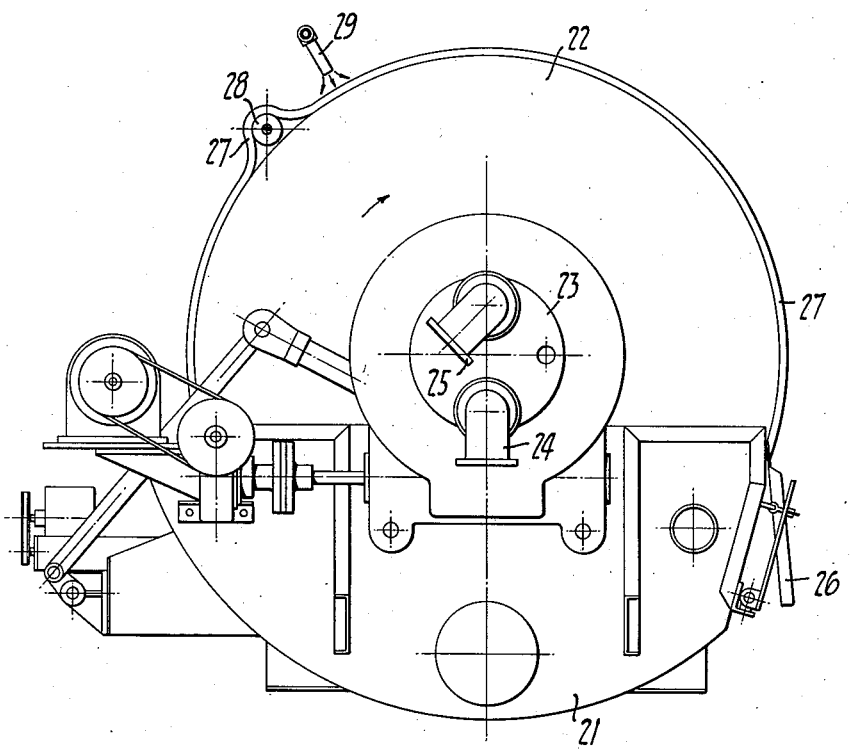
FIG_3_
INVENTOR.
Gerald O. Hillier
BY
ATTORNEY.

Patented Aug. 4, 1942

2,291,963

UNITED STATES PATENT OFFICE 2,291,963

METHOD AND APPARATUS FOR FILTRATION

Gerald O. Hillier, Point Richmond, Calif., assignor to Oliver United Filters Incorporated, San Francisco, Calif., a corporation of Nevada Application May 11, 1938, Serial No. 207,205

7 Claims. (Cl. 210—201)

This invention relates in general to a method and apparatus for filtration, and more particularly to a method and means whereby a sharper separation of the filtrate and wash water may be made and whereby the cake formed on the filter may be more readily removed.

Filtration, except on gravity filters, is effected by a differential filtering pressure. This filtering pressure is purposely maintained during the cake forming or pick-up period and during the washing period, and in many instances prevails during the discharge period or period of cake removal. For example, in filtration by means of a continuous rotary drum vacuum filter wherein independent filter cells or compartments are formed on the periphery of a rotary drum and the drum rotates within a tank containing the sludge to be filtered, the interior of each of the cells is maintained under subatmospheric pressure by a single automatic valve or by individual valves communicating with each cell during that period of time in which it rotates through the sludge contained in the tank and up to the point at which the cake formed thereon is discharged on the descending side of the drum by a scraper or doctor. In many instances it is desired to wash the cake formed on the periphery of the drum, and this is done by applying wash water to the cake after the cake emerges from the sludge and prior to the point at which it is removed or discharged. Furthermore, it is oftentimes desired to effect a sharp separation of the filtrate passing through the filter and the wash water which is later applied. Although the larger portion of the filtrate passing into each cell or compartment is removed therefrom within a short interval after the cake emerges from the sludge, a certain quantity of it remains entrained within the cells and the piping leading to the automatic valve. The removal of the filtrate so entrained does not depend primarily upon the difference in pressure between the exterior and interior of the filter, but rather on the velocity of the air passing through the cells and piping. Due to the fact that each cell is blanked off by the cake formed thereon, only a small quantity of air can pass through the cell.

In general, therefore, it is one of the objects of this invention to provide means by which a portion of the filter surface of a filter cell or compartment may be exposed after the cake has been formed thereon and prior to the application of wash water, in order to permit the free passage of air through the cell so that the entrained filtrate may be removed and separated by an automatic valve from the wash water subsequently applied.

In some types of filters such as, for example, shown in the United States patent to Young No. 2,052,156 of August 25, 1936, designed for handling large quantities of filtrate, the automatic valve ordinarily used on continuous rotary drum filters is not resorted to, but instead each of the cells or compartments of the drum is provided on its lower side with an individual gravity operated valve and the entire interior of the drum is maintained under a subatmospheric pressure. In this type of filter the sole purpose of the individual gravity operated valves is to cut off the vacuum from each cell just prior to the discharge of the cake from the drum, and which is usually effected by a doctor or scraper. Although the gravity operated valves serve to cut off communication between each of the cells and the interior of the drum, it can be appreciated that since the cake formed and carried on the periphery of the drum blanks off or seals the filtering surface of each cell, each cell will be under the influence of subatmospheric pressure while the exterior of each cell is subjected to atmospheric pressure. It will therefore be seen that the inwardly directed differential pressure so existing resists the removal of cake from the drum.

It is therefore a further object of this invention to provide a method and means whereby a portion of the filtering surface of the filter cell may be exposed just prior to the discharge period to permit the free passage of air therethrough in order to equalize the external and internal pressures.

More specifically, the object of this invention is the provision, in combination with a filter having a filter cell arranged to travel in a closed path, of a band adapted to blank off a portion of the filtering surface of the cell, and means in the path of said cell for lifting the band in any desired period during the cycle of operation of the filter in order to permit the free passage of air through the cell either for the purpose of making a sharp separation between the filtrate and wash water or for aiding the discharge of the cake, or for both purposes.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a vertical mid-section of a continuous, high flow filter such as shown in the United States Young patent above referred to and in which the objects of my invention have been embodied.

Figure 2 is a partial side elevation of the filter shown in Figure 1.

Figure 3 is an end elevation of a standard metallurgical rotary drum filter such as manufactured by Oliver United Filters Incorporated and to which my invention has been applied.

The filter as shown in Figures 1 and 2 comprises a semi-cylindrical tank 1 within which is arranged to rotate a drum 2 provided with a plurality of contiguous independent filtrate compartments or cells 3. Each of these compartments is provided on its outer surface with a filter medium 4 and with a filtrate port 5 over which is secured a gravity operated valve 6. The interior of the drum 2 is maintained under subatmospheric pressure by a vacuum pump (not shown) communicating with the drum through an elbow 7 and one of the trunnions on which the drum is supported. Secured to the tank 1 adjacent the descending side of the drum 2 is a doctor or scraper 8 formed on its lower side with a trough 9 for accommodating a scroll 11. The scraper 8, in accordance with well known practice should lie in a plane substantially tangential with the outer surface of the filter drum, in order properly to discharge the cake formed and carried by the drum.

Secured to one end of the tank 1 on the descending side of the drum is a bracket 12 provided with a sleeve or socket 13 for receiving a pin 14. Journaled on the pin 14 is a pulley 15 arranged to extend over the outer edge of the drum 2. Surrounding the outer end of the drum 2 and passing over the pulley 15 and under the idler 15a is a band or belt 16 which serves to blank off the outer end of the filter medium 4 of each of the individual filtrate compartments or cells 3 except at the point of divergence of the band 16 from the drum as effected by the pulley 15.

The operation of a filter as above described is as follows: The sludge to be filtered is fed to the filter tank 1 and maintained at a predetermined level in the usual manner. Vacuum is then maintained within the entire interior of the drum by connecting the elbow 7 to a vacuum pump. Upon the rotation of the drum, the liquid content of the sludge carried in the tank 1 passes through the filter medium into the compartments 3 and then through the ports 5 and valve 6 into the interior of the drum. At the same time the solid content of the pulp forms as a cake over the entire surface of the filter medium with the exception of that portion thereof which is covered by the band or belt 16. It will therefore be seen that the entire surface of the drum is blanked off either by the cake which is formed on the filter medium or by the belt or band 16, except at the point at which the band 16 is made to diverge from the drum by passing over the pulley 15. At this point the valves 6 are closed and air under atmospheric pressure is permitted to enter the filtrate compartments 3, equalizing the pressure on either side of the filter medium. Under these conditions the scraper 8 can discharge the cake carried on the filtering surface far more effectively than would be the case if the filtrate compartments 3 were under the influence of a partial vacuum.

Referring now to Figure 3: In this figure, my invention has been applied to a standard rotary drum filter provided with an automatic two-ported valve for the purpose of more sharply separating the filtrate from the wash water used to wash the cake. This type of filter comprises a tank 21, within which is rotatably disposed a longitudinally sectionalized drum 22. Each of the drum sections, compartments, or cells, communicates through suitable piping with an automatic valve 23 having a pick-up or filtrate port 24 and a washing and drying port 25. The cake formed on the surface of the drum is discharged by a doctor or scraper 26 disposed adjacent the drum at a point well below its horizontal center line.

Since the construction and operation of this type of filter is well known and disclosed in such prior patents as, for example, the Akins Patent 1,059,327 of April 15, 1913, there appears to be no necessity of describing the filter in further detail. In order to effect a sharper separation of the filtrate and wash water in this type of filter, a band or belt 27 is made to pass over one end of the peripheral filtering surface of the drum and over a pulley 28, in exactly the same manner as described in connection with Figures 1 and 2, with the exception that the pulley 28 is located on the rising side of the drum intermediate the point at which the drum emerges from the tank and the point at which wash water is applied by the spray 29.

The operation of this type of filter is briefly as follows: The pulp is fed to the tank 21 and maintained at a predetermined level in the usual manner. The drum is slowly rotated and vacuum is successively applied by the pick-up port 24 to the filter cells or compartments as they pass through the pick-up cycle. As each compartment passes the point at which the pulley 28 is located, communication with the valve port 24 is cut off and communication with the wash water and drying port 25 is established. Since the band 27 is made to diverge momentarily from the drum 22 as it passes over the pulley 28, air is permitted to pass freely through the compartment or cell beneath the pulley 28 at a relatively high velocity. In passing through the cells or compartments and the piping connecting the compartments with the automatic valve, the air entrains substantially all of the residual filtrate that may be present within these members, and causes such residual filtrate to pass with it through the valve 24. The wash water thereafter applied by the spray 29 passes through the compartments and piping, which are free and clear of filtrate, into the port 25. The remainder of the cycle of operation is effected in accordance with standard practice.

It will therefore be seen that my invention may be applied to a continuous filter for either of two purposes: As shown in Figures 1 and 2, it serves the purpose of reducing any residual differential pressure existing in the filtrate compartments or cells at the point of discharge, thereby permitting a more effective discharge of the cake deposited on the filtering surface. As illustrated in Figure 3, my invention may be utilized for effecting a sharper separation between the filtrate and wash water by permitting a free passage of air through the compartments or cells and their associated piping at a point prior to the application of the wash water.

I claim:

1. A filter comprising: a filter cell arranged to travel in a closed path; blanking means for blanking off a portion of the filtering surface of said cell; means for periodically delivering to said cell sludge to be filtered; means for subjecting said cell to a differential filtering pressure in order to cause the liquid content of said sludge to pass through said cell as filtrate and its solid content to form a cake thereon; means in the path of said cell for momentarily lifting said blanking means from said cell in order to expose a portion of its filtering surface; and independent means for discharging from said cell the cake formed thereon.

2. A filter comprising: a filter cell arranged to travel in a closed path; a band disposed over a portion of the filtering surface of said cell and arranged to travel therewith; means for periodically delivering to said cell sludge to be filtered; means for subjecting said cell to a differential pressure in order to cause fluid to pass therethrough and a cake of solids to form thereon; means in the path of said cell for momentarily lifting said band from said cell in order to expose a portion of its filtering surface; and independent means for discharging from said cell the cake formed thereon.

3. A filter comprising: a filter cell; blanking means for blanking off a portion of the filtering surface of said cell; means for periodically delivering to said cell sludge to be filtered; means for subjecting said cell to a differential filtering pressure in order to cause the liquid content of said sludge to pass through said cell as filtrate and its solid content to form a cake thereon; means for momentarily lifting said blanking means in order to permit the free passage of air through said cell and thereby decrease said differential filtering pressure; and independent means for removing from said cell the cake formed thereon.

4. The method of operating a filter wherein sludge to be filtered is periodically delivered to a filter cell, cake formation is effected during a pick-up period under the influence of a differential filtering pressure, and the cake formed is then discharged from the filter cell, during a discharge period, comprising: applying blanking means to a portion of the filtering surface of the filter cell during the pick-up period; and removing said blanking means subsequent to said pick-up period and prior to the discharge period.

5. A filter comprising: a filter cell arranged to travel in a closed path through a body of the material to be filtered; means for subjecting said cell to an inwardly directed differential pressure for causing fluid to pass therethrough and a cake of solids to form thereon; means for discharging from said cell the cake formed thereon; blanking means for blanking off a portion of the filtering surface of said cell; means operable prior to discharging said cake for lifting said blanking means from said cell in order to permit the free passage of air therethrough so as to materially reduce said differential pressure.

6. A filter comprising: a filter cell arranged to travel in a closed path through a body of the material to be filtered; means for subjecting said cell to an inwardly directed differential pressure for causing fluid to pass therethrough and a cake of solids to form thereon; means for discharging from said cell the cake formed thereon; a band disposed over a portion of the filtering surface of said cell and arranged to travel therewith; and means in the path of said cell and operable prior to the discharge of the cake therefrom for lifting said band from said cell in order to expose a portion of its filtering surface and thereby permit the ingress of gas therethrough to materially reduce said differential pressure.

7. A filter comprising: a filter cell arranged to travel in a closed path; means for periodically delivering to said cell sludge to be filtered; means for subjecting said cell to an inwardly directed differential pressure in order to cause the liquid content of said sludge to pass through said cell as filtrate and its solid content to form a cake thereon; means in the path of said cell for momentarily exposing a portion of the foraminous surface of the cell to atmospheric pressure in order substantially to increase the pressure within said cell; and means for discharging from said cell the cake formed thereon.

GERALD O. HILLIER.